(12) United States Patent
Won

(10) Patent No.: US 11,205,911 B2
(45) Date of Patent: Dec. 21, 2021

(54) ENERGY STORAGE SYSTEM

(71) Applicant: LS ELECTRIC CO., LTD., Anyang-si (KR)

(72) Inventor: Sung-Ha Won, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/765,759

(22) PCT Filed: Nov. 15, 2018

(86) PCT No.: PCT/KR2018/013995
§ 371 (c)(1),
(2) Date: May 20, 2020

(87) PCT Pub. No.: WO2019/107807
PCT Pub. Date: Jun. 6, 2019

(65) Prior Publication Data
US 2020/0287391 A1    Sep. 10, 2020

(30) Foreign Application Priority Data

Nov. 28, 2017  (KR) .................. 10-2017-0159941
Nov. 28, 2017  (KR) .................. 10-2017-0159942

(51) Int. Cl.
*H02J 7/00*     (2006.01)
*H02J 9/06*     (2006.01)
*H02J 3/32*     (2006.01)

(52) U.S. Cl.
CPC ............. *H02J 7/007* (2013.01); *H02J 3/32* (2013.01); *H02J 7/0063* (2013.01); *H02J 9/062* (2013.01); *H02J 2207/20* (2020.01)

(58) Field of Classification Search
CPC .... H02J 3/32; H02J 9/062; H02J 3/381; H02J 3/383; H02J 2207/20; H02J 3/46;
(Continued)

(56) References Cited

U.S. PATENT DOCUMENTS 6,487,096 B1    11/2002  Gilbreth et al.
8,232,676 B2 *   7/2012  Gurunathan ............ H02J 9/062
                                                          307/66
(Continued)

FOREIGN PATENT DOCUMENTS

JP    2002510957 A      4/2002
JP    2008228517 A  *   9/2008
(Continued)

OTHER PUBLICATIONS

International Search Report for related International Application No. PCT/KR2018/013995; report dated Jun. 6, 2019; (5 pages).
(Continued)

*Primary Examiner* — Ryan Johnson
(74) *Attorney, Agent, or Firm* — K&L Gates LLP

(57) ABSTRACT

The present invention relates to an energy storage system. An energy storage system, according to an embodiment of the present invention, relates to an energy storage system for managing power of a system and a direct current (DC) distribution network linked with the system, the energy storage system comprising: a first converter connected between the system and the DC distribution network so as to control a voltage of the DC distribution network; a second converter connected to the DC distribution network; a load connected to the second converter, and controlling the voltage by means of the second converter; a battery connected to the DC distribution network; and a third converter connected between the battery and the load, and controlling discharge of the battery.

20 Claims, 10 Drawing Sheets

(58) Field of Classification Search
CPC .. H02J 9/06; H02J 15/00; Y02E 70/30; Y02B 10/70; H02M 7/493; H02M 2007/4822; H02M 7/17

See application file for complete search history.

(56) References Cited

U.S. PATENT DOCUMENTS

| | | | |
|---|---|---|---|
| 8,810,066 | B2 | 8/2014 | Moon |
| 9,293,923 | B2 | 3/2016 | Kim |
| 9,787,170 | B2 | 10/2017 | Inoue et al. |
| 10,554,076 | B2 | 2/2020 | Nakano |
| 10,951,033 | B2 * | 3/2021 | Chae ............... H02J 3/38 |
| 2011/0210614 | A1 | 9/2011 | Min |
| 2013/0088900 | A1 * | 4/2013 | Park ............... H02J 3/381 363/71 |
| 2015/0001932 | A1 | 1/2015 | Inoue et al. |
| 2017/0093187 | A1 | 3/2017 | Park et al. |
| 2019/0067989 | A1 * | 2/2019 | Beg ............... H02J 7/0068 |

FOREIGN PATENT DOCUMENTS

| | | |
|---|---|---|
| JP | 2010093868 A | 4/2010 |
| JP | 2017085867 A | 5/2017 |
| JP | 2017205007 A | 11/2017 |
| KR | 20110069398 A | 6/2011 |
| KR | 20120100157 A | 9/2012 |
| KR | 101369633 B1 | 3/2014 |
| KR | 20160129153 A | 11/2016 |
| KR | 20170048992 A | 5/2017 |
| KR | 1020170079184 A | 7/2017 |
| WO | 2013121618 A1 | 5/2015 |
| WO | 2015102398 A1 | 7/2015 |
| WO | 2016203635 A1 | 12/2016 |

OTHER PUBLICATIONS

Written Opinion for related International Application No. PCT/KR2018/013995; report dated Jun. 6, 2019; (6 pages).

Extended European Search Report from corresponding European Patent Application No. 18884397.3, dated Nov. 24, 2020.

Korean Office Action for related Korean Application No. 10-2017-0159941; action dated Feb. 25, 2021; (5 pages).

Japanese Office Action for related Japanese Application No. 2020-528924; action dated Jul. 27, 2021; (5 pages).

Korean Office Action for related Korean Application No. 10-2017-0159941; action dated Nov. 8, 2021; (5 pages).

* cited by examiner

【FIG. 1】
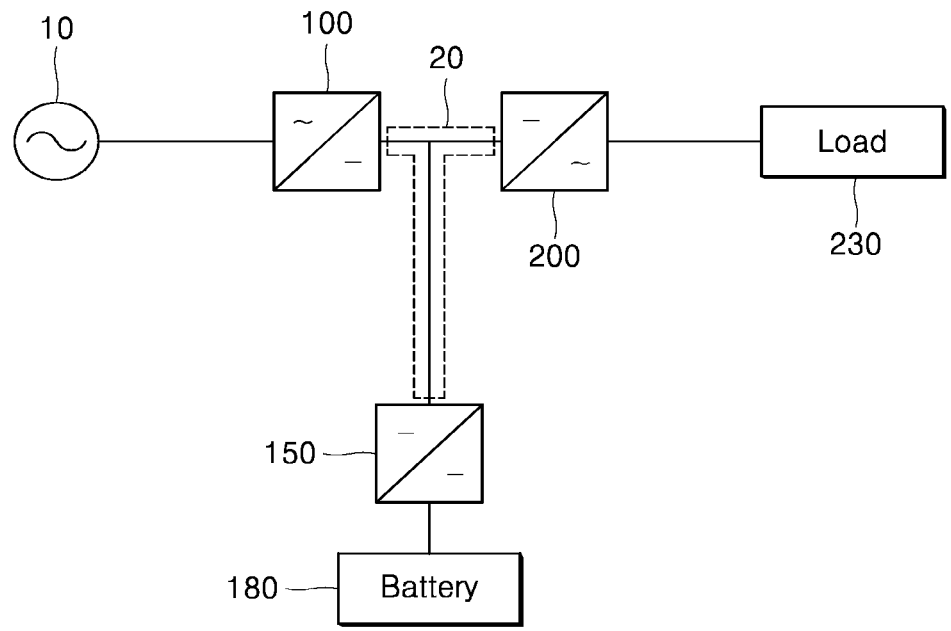
<PRIOR ART>
【FIG. 2】
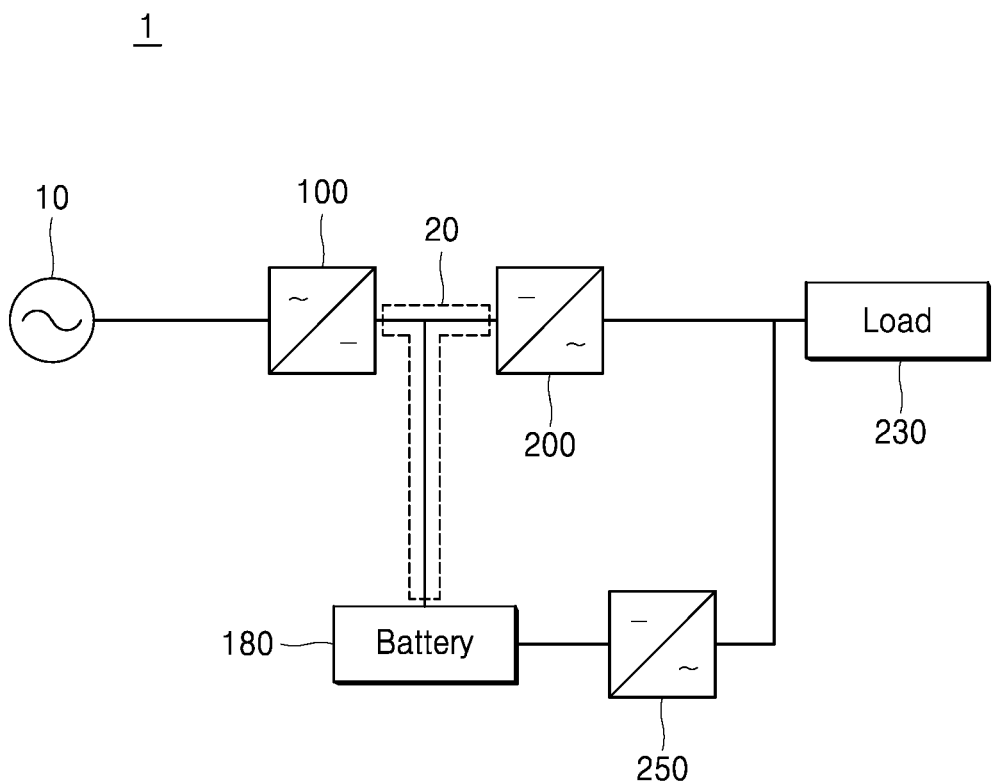

[FIG. 3]
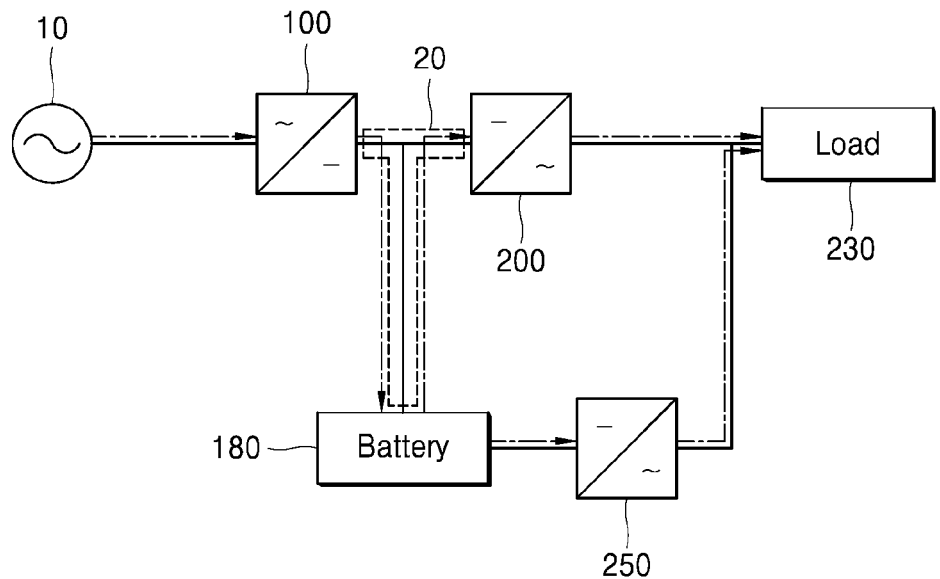
[FIG. 4]
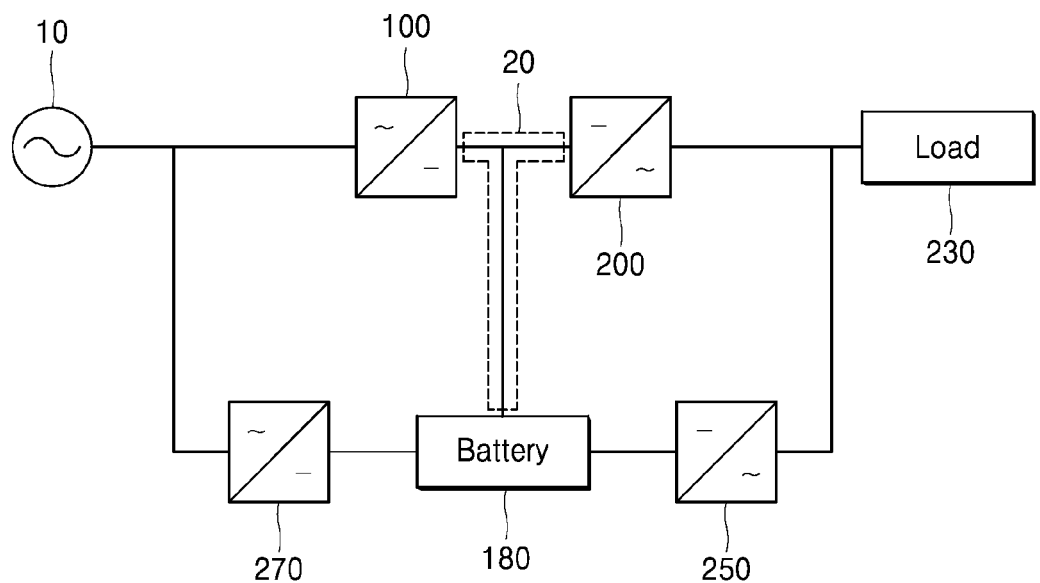

【FIG. 5】
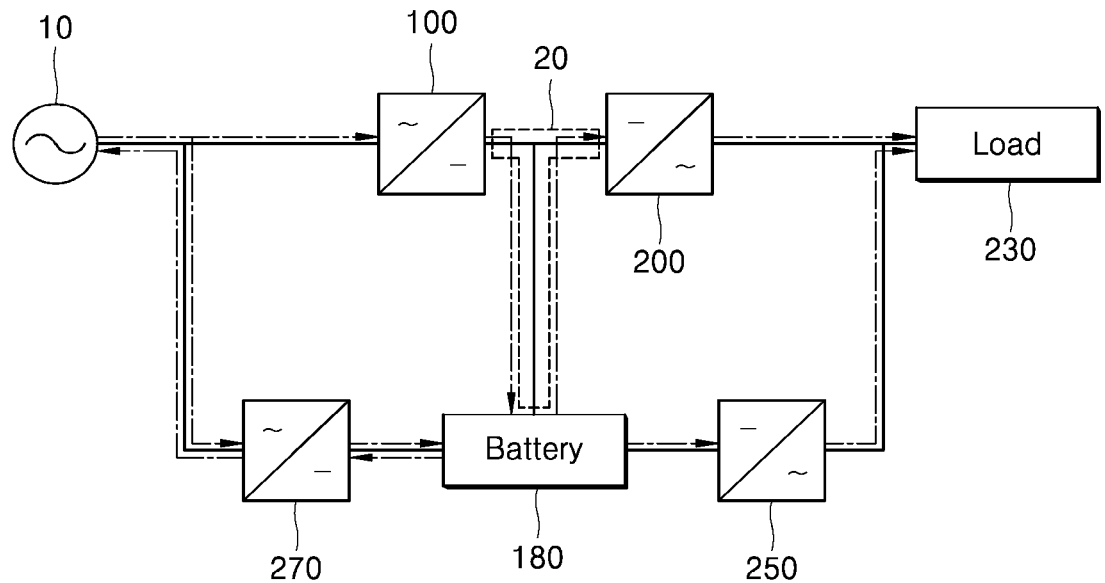
【FIG. 6】
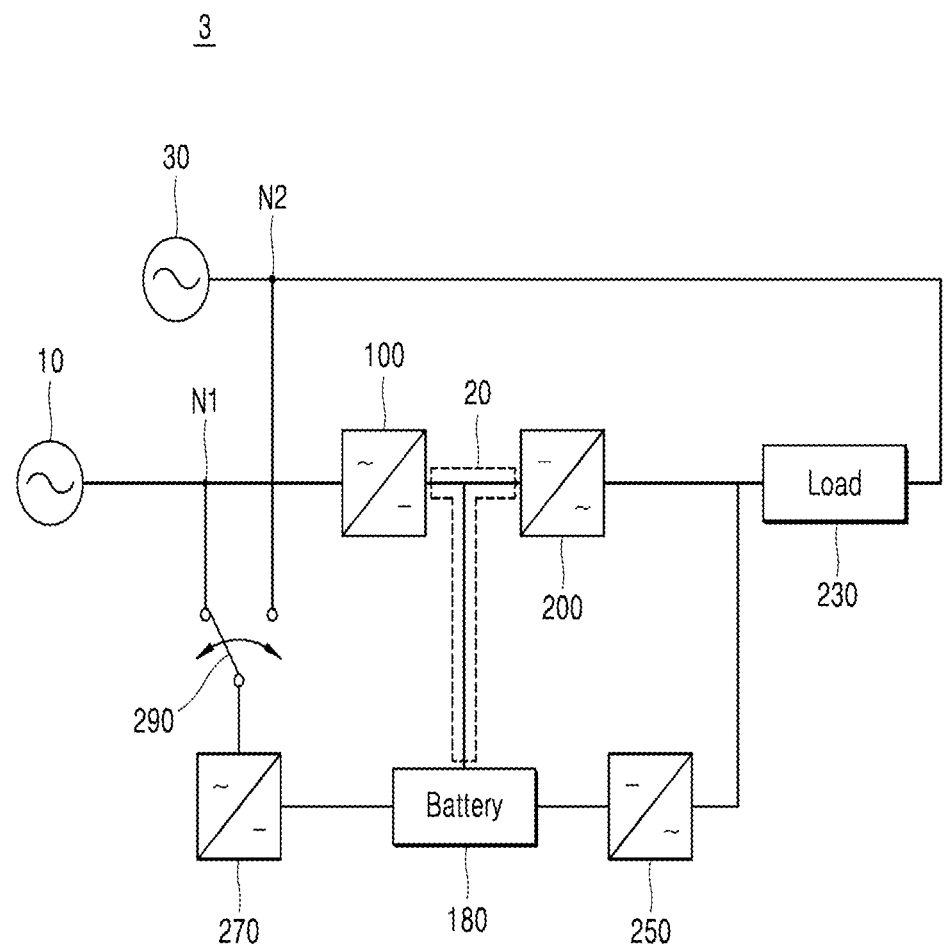

[FIG. 7]
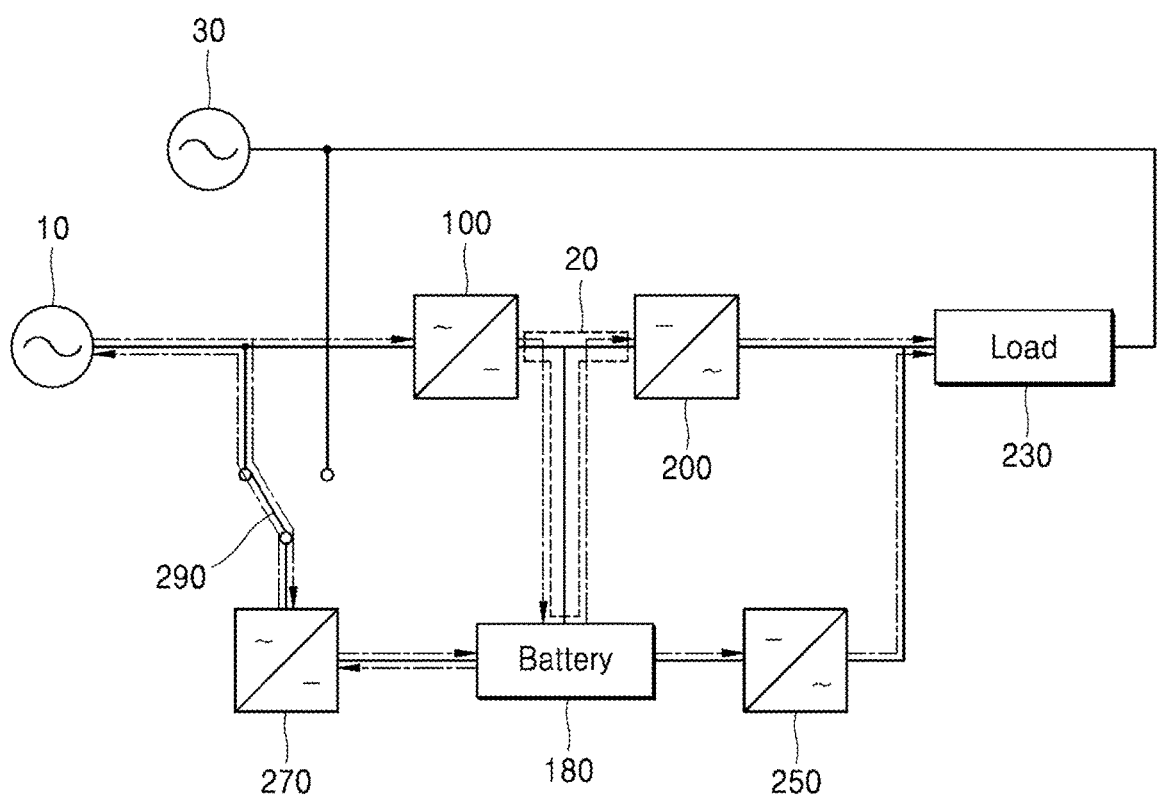

[FIG. 8]
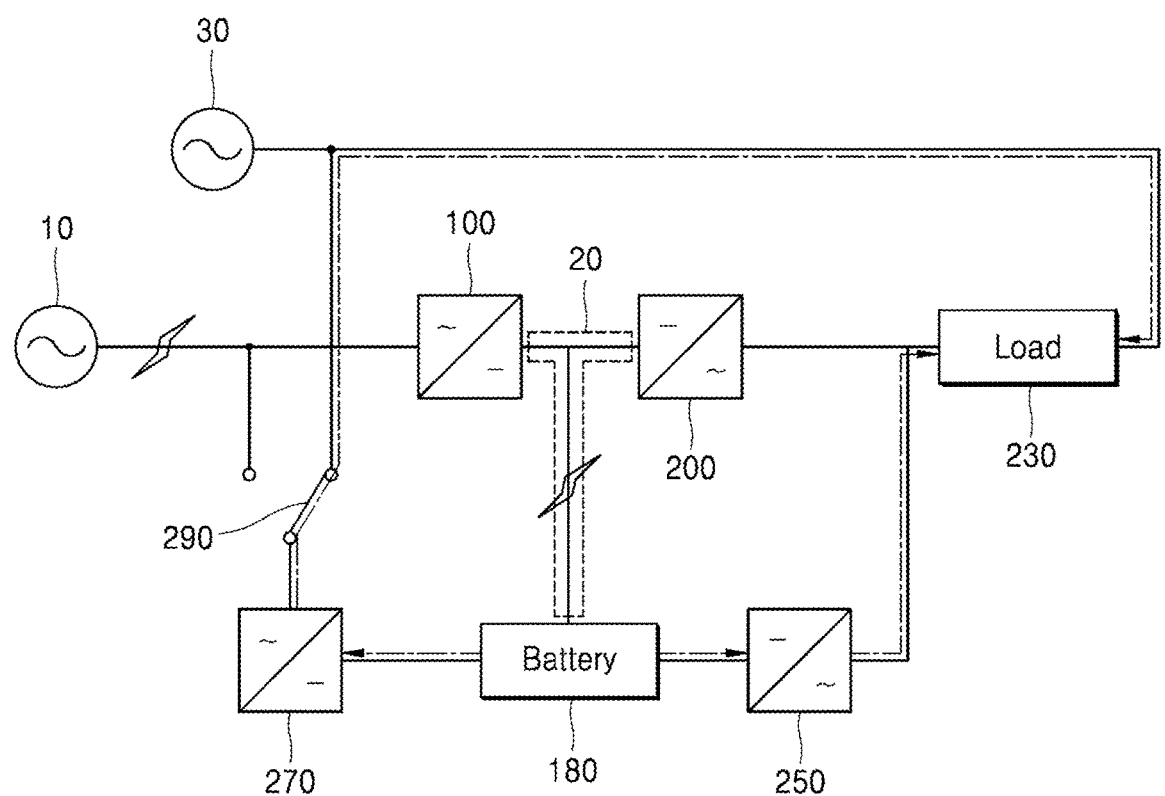

[FIG. 9]
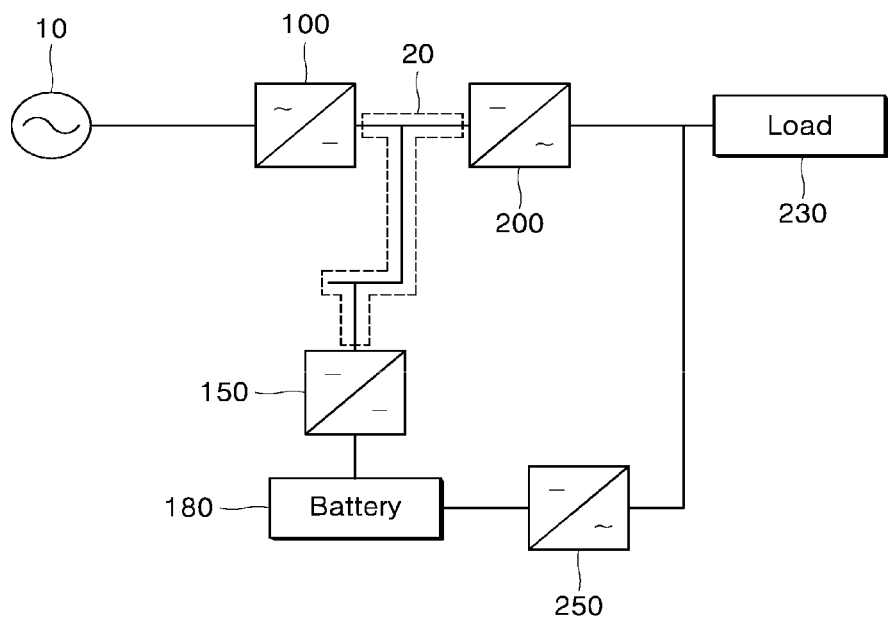
[FIG. 10]
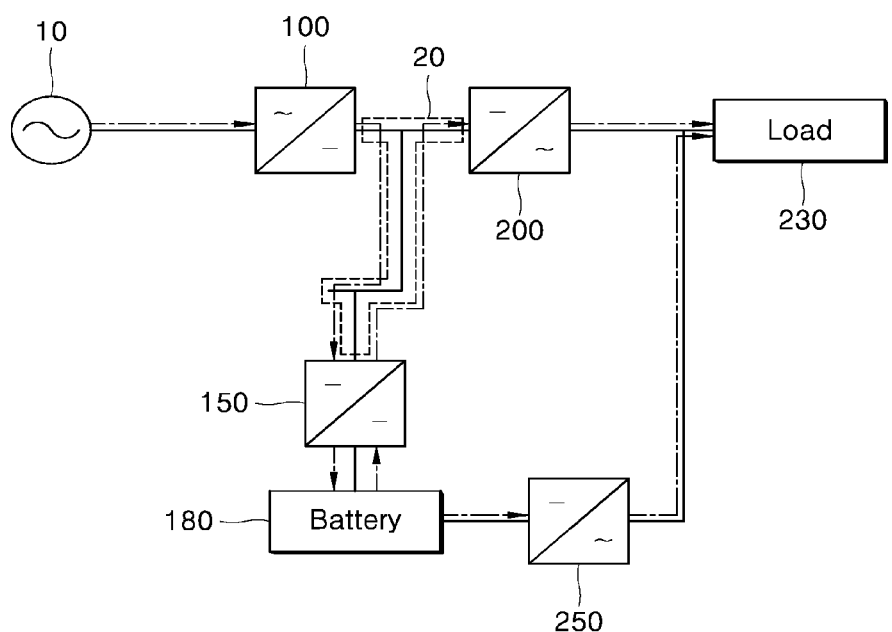

【FIG.11】
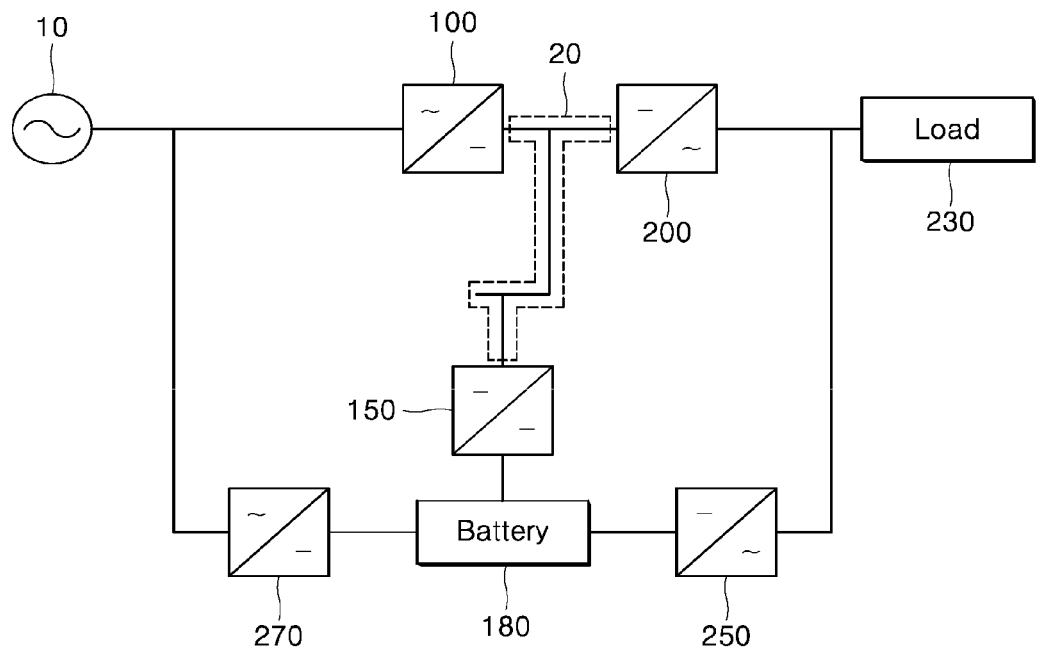
【FIG. 12】
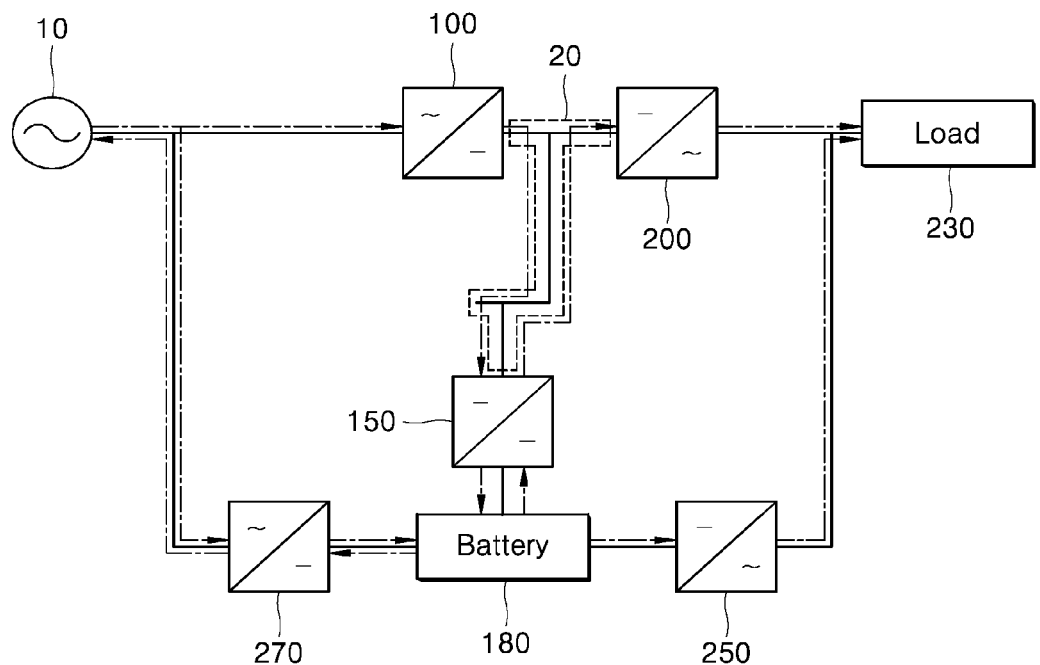

[FIG. 13]
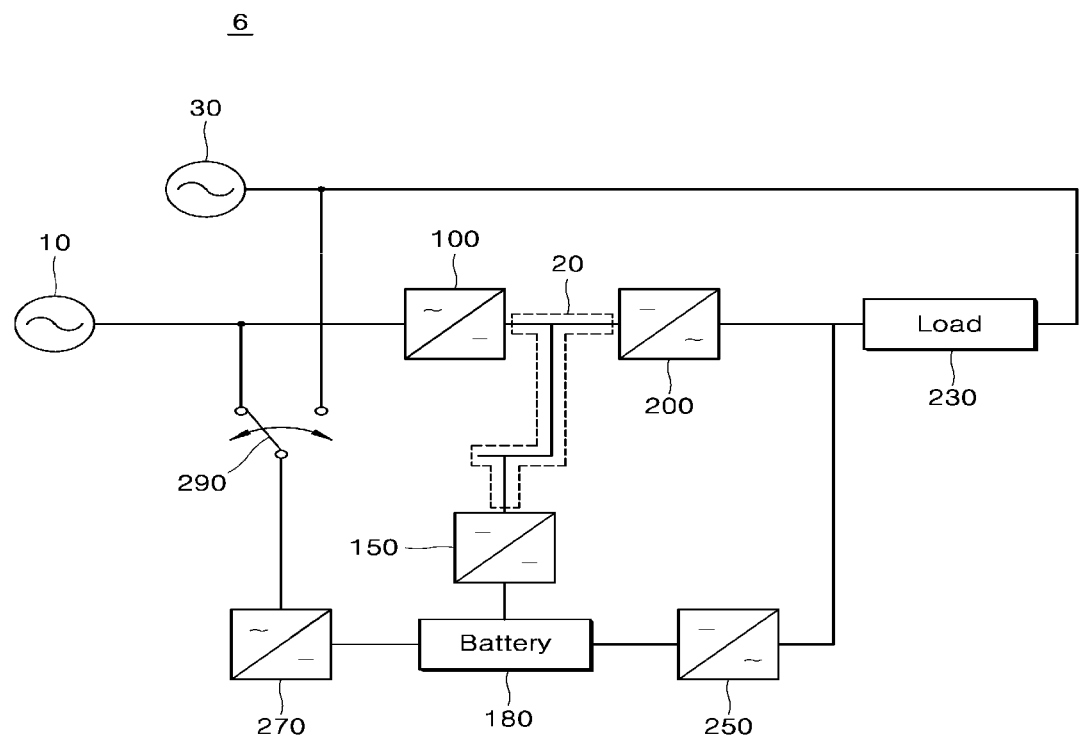

[FIG. 14]
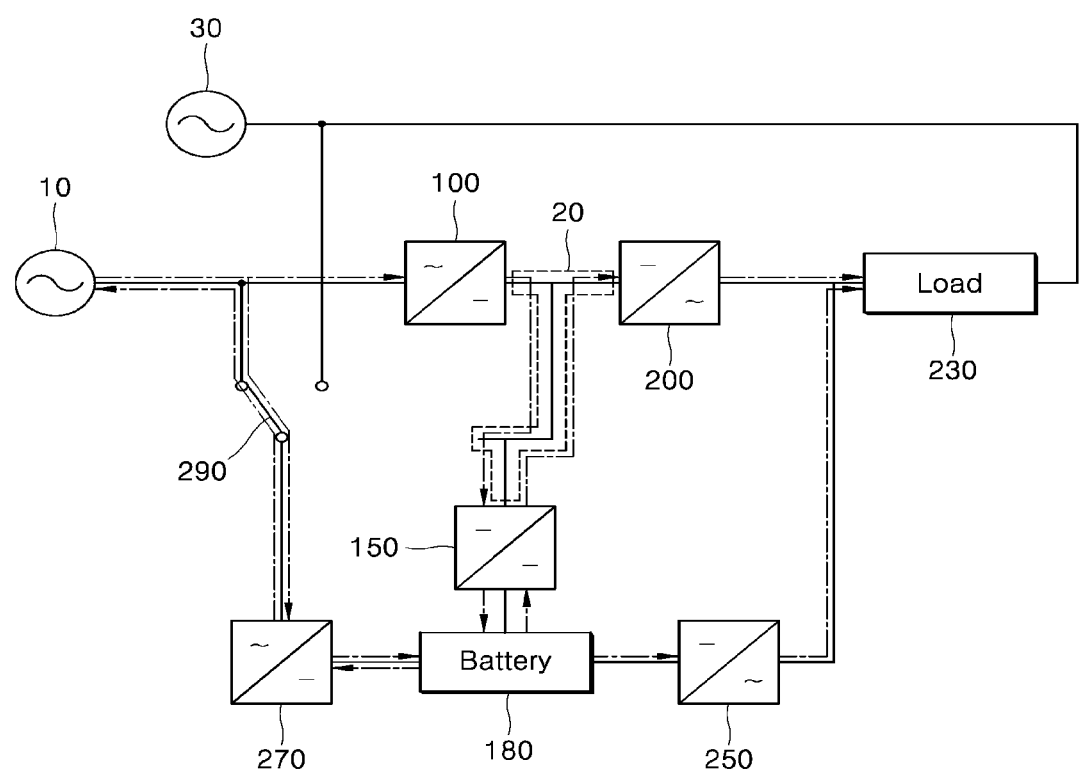

[FIG. 15]
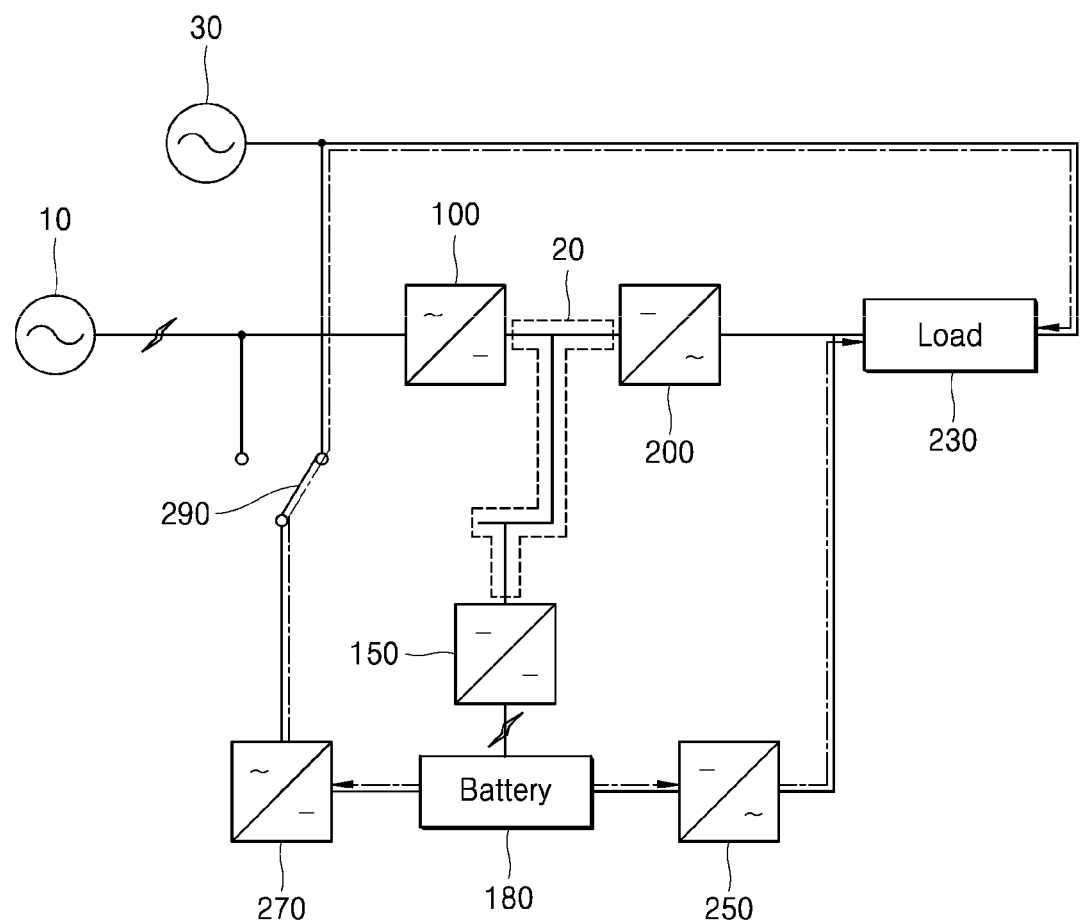

ENERGY STORAGE SYSTEM

CROSS-REFERENCE TO RELATED APPLICATIONS

The present application is a National Stage of International Application No. PCT/KR2018/013995, filed on Nov. 15, 2018, which claims the benefit of earlier filing date and right of priority to Korean Application No. 10-2017-0159941 filed on Nov. 28, 2017, and Korean Application No. 10-2017-0159942 filed on Nov. 28, 2017, the contents of which are all hereby incorporated by reference herein in their entirety.

FIELD OF THE INVENTION

The present disclosure relates to an energy storage system that may efficiently perform charging and discharging of a battery.

BACKGROUND OF THE INVENTION

An energy storage system (ESS) stores generated power in each of connected systems including a power plant, a substation, and a transmission line, etc. and selectively and efficiently uses the stored power when the power is needed, thereby to increase energy efficiency.

The energy storage system may level an electric load having a large fluctuation between time regions and between seasons, thereby improve an overall load rate. Thus, a power generation cost may be lowered, and an investment cost required for expansion of a power facility and an operation coat thereof may be reduced, thereby lowering an electricity fee, and saving energy.

This energy storage system is installed in a power generation station, transmission and distribution lines, and a customer site in a power system. The ESS has functions such as frequency regulation, generator output stabilization using renewable energy, peak shaving, load leveling, and emergency power supply.

The energy storage system is largely classified into a physical energy storage system and a chemical energy storage system based on an energy storage scheme. The physical energy storage system may employ pumped storage power generation, compressed air storage, and flywheel. The chemical energy storage system may employ a lithium ion battery, a lead acid battery, or a Nas battery.

In this connection, a conventional energy storage system will be described with reference to FIG. 1.

FIG. 1 is a schematic diagram illustrating a conventional energy storage system.

In the conventional energy storage system, as shown in FIG. 1, power discharged from a battery 180 is supplied to a load 230 via a DC to DC converter 150.

Accordingly, when the load 230 has an overload which is 1.5 times of a normal load during a discharge operation of the battery 180, the DC to DC converter 150 has the overload of 1.5 times. Further, when the DC to DC converter 150 fails, the power from the battery 180 may not be supplied to the load 230.

BRIEF SUMMARY OF THE INVENTION

A purpose of the present disclosure is to provide an energy storage system capable of efficiently performing charging and discharging of a battery.

In order to achieve the purpose, an energy storage system for managing power of a power system and power of a direct current (DC) power distribution network connected to the power system comprises a first converter connected to and disposed between the power system and the DC power distribution network and configured to control voltage of the DC power distribution network; a second converter connected to the DC power distribution network; a load connected to the second converter, wherein the second converter is configured to control voltage of the load; a battery connected to the DC power distribution network; and a third converter connected to and disposed between the battery and the load, and configured to control discharging of the battery.

Voltage discharged from the battery under control by the third converter is transferred directly to the load.

The energy storage system further comprises a fourth converter connected to and disposed between the battery and the power system, wherein the fourth converter is configured to control charging and discharging of the battery.

Each of the first and fourth converters is configured to convert voltage supplied from the power system and to charge the battery with the converted voltage.

Voltage discharged from the battery under control by the third converter is transferred directly to the load, wherein voltage discharged from the battery under control by the fourth converter is transferred to the power system.

The energy storage system further comprises: an auxiliary power system connected to the load; and a switch configured to selectively connect the fourth converter to a first node between the power system and the first converter or to a second node between the auxiliary power system and the load.

One end of the switch is connected to the fourth converter, while the other end of the switch is selectively connected to either the first node or the second node.

When the power system fails while the fourth converter is connected to the first node, the fourth converter is connected to the second node via an switching operation of the switch, the battery is discharged under control by the fourth converter, and voltage discharged from the battery is transferred to the load via the second node.

The first converter operates in a DC voltage control mode to control voltage of the DC power distribution network, wherein the second converter operates in a constant voltage constant frequency (CVCF) mode to control voltage of the load, wherein each of the third and fourth converters operates in a power control mode to control power of the battery.

The first converter is configured to convert alternating current (AC) voltage supplied from the power system to DC voltage and supply the converted DC voltage to the DC power distribution network, or to convert DC voltage supplied from the DC power distribution network to AC voltage and supply the converted AC voltage to the power system, wherein the second converter is configured to convert DC voltage supplied from the DC power distribution network into AC voltage and supply the converted AC voltage to the load, wherein the third converter is configured to convert DC voltage supplied from the battery into AC voltage and supply the converted AC voltage to the load, wherein the fourth converter is configured to convert AC voltage supplied from the power system to DC voltage and supply the converted DC voltage to the battery, or to convert DC voltage supplied from the battery to AC voltage and supply the converted AC voltage to the power system.

In order to achieve the purpose, an energy storage system for managing power of a power system and power of a direct current (DC) power distribution network connected to the power system comprises a first converter connected to and disposed between the power system and the DC power distribution network and configured to control voltage of the DC power distribution network; a second converter connected to the DC power distribution network; a battery connected to the second converter, wherein the second converter is configured to control charging and discharging of the battery; a third converter connected to the DC power distribution network; a load connected to the third converter, wherein the third converter is configured to control voltage of the load; and a fourth converter connected to and disposed between the battery and the load, wherein the fourth converter is configured to control discharging of the battery.

Voltage discharged from the battery under control by the second converter is transferred to the load via the DC power distribution network, wherein voltage discharged from the battery under control by the fourth converter is transferred directly to the load.

The energy storage system further comprises a fifth converter connected to and disposed between the battery and the power system, wherein the fifth converter is configured to control charging and discharging of the battery.

The second converter is configured to convert voltage supplied from the DC power distribution network and to charge the battery with the converted voltage, wherein the fifth converter is configured to convert voltage supplied from the power system and to charge the battery with the converted voltage.

Voltage discharged from the battery under control by the second converter is transferred to the load via the DC power distribution network, wherein voltage discharged from the battery under control by the fourth converter is transferred directly to the load, wherein voltage discharged from the battery under control by the fifth converter is transferred to the power system.

The energy storage system further comprises: an auxiliary power system connected to the load; and a switch configured to selectively connect the fifth converter to a first node between the power system and the first converter or to a second node between the auxiliary power system and the load.

One end of the switch is connected to the fifth converter, while the other end of the switch is selectively connected to either the first node or the second node.

When the power system fails while the fifth converter is connected to the first node, the fifth converter is connected to the second node via an switching operation of the switch, the battery is discharged under control by the fifth converter, and voltage discharged from the battery is transferred to the load via the second node.

The first converter operates in a DC voltage control mode to control voltage of the DC power distribution network, wherein each of the second converter and the fourth and fifth converters operates in a power control mode to control power of the battery, wherein the third converter operates in a constant voltage constant frequency (CVCF) mode to control voltage of the load.

The first converter is configured to convert alternating current (AC) voltage supplied from the power system to DC voltage and supply the converted DC voltage to the DC power distribution network, or to convert DC voltage supplied from the DC power distribution network to AC voltage and supply the converted AC voltage to the power system, wherein the second converter is configured to convert DC voltage supplied from the DC power distribution network into DC voltage and supply the converted DC voltage to the battery, or to convert DC voltage supplied from the battery into DC voltage and supply the converted DC voltage to the DC power distribution network, wherein the third converter is configured to convert DC voltage supplied from the DC power distribution network into AC voltage and supply the converted AC voltage to the load, wherein the fourth converter is configured to convert DC voltage supplied from the battery into AC voltage and supply the converted AC voltage to the load, wherein the fifth converter is configured to convert AC voltage supplied from the power system to DC voltage and supply the converted DC voltage to the battery, or to convert DC voltage supplied from the battery to AC voltage and supply the converted AC voltage to the power system.

As described above, according to the present disclosure, efficiently performing the charging and discharging of the battery via the various converters may allow the overload to be applied to the converter during the discharge to be reduced. Furthermore, even when some converters connected to the battery fail, a power supply path connecting the battery and the load to each other may be secured via the remaining converters. Thus, reliability of the energy storage system may be secured.

In addition to the above-described effects, specific effects of the present disclosure will be described in describing specific details for carrying out the disclosure.

BRIEF DESCRIPTIONS OF DRAWINGS

FIG. 1 is a schematic diagram illustrating a conventional energy storage system.

FIG. 2 is a schematic diagram illustrating an energy storage system according to an embodiment of the present disclosure.

FIG. 3 is a schematic diagram illustrating a power flow according to battery charging and discharging in FIG. 2.

FIG. 4 is a schematic diagram illustrating an energy storage system according to another embodiment of the present disclosure.

FIG. 5 is a schematic diagram illustrating a power flow according to battery charging and discharging in FIG. 4.

FIG. 6 is a schematic diagram illustrating an energy storage system according to still another embodiment of the present disclosure.

FIG. 7 and FIG. 8 is a schematic diagram illustrating a power flow according to battery charging and discharging of FIG. 6.

FIG. 9 is a schematic diagram illustrating an energy storage system according to yet still another embodiment of the present disclosure.

FIG. 10 is a schematic diagram illustrating a power flow according to battery charging and discharging in FIG. 9.

FIG. 11 is a schematic diagram illustrating an energy storage system according to further yet still another embodiment of the present disclosure.

FIG. 12 is a schematic diagram illustrating a power flow according to battery charging and discharging in FIG. 11.

FIG. 13 is a schematic diagram illustrating an energy storage system according to further yet still another embodiment of the present disclosure.

FIG. 14 and FIG. 15 are schematic diagrams illustrating a power flow according to battery charging and discharging in FIG. 13.

DETAILED DESCRIPTION OF THE INVENTION

The purposes, features and advantages as above-described will be described in detail below with reference to the accompanying drawings. Accordingly, a person with ordinary skill in a technical field to which the present disclosure belongs may easily implement an technical idea of the present disclosure. In describing the present disclosure, when it is determined that a specific description of a known element related to the present disclosure may unnecessarily obscure a gist of the present disclosure, detailed descriptions thereof may be omitted. Hereinafter, preferred embodiments of the present disclosure will be described in detail with reference to the accompanying drawings. In the drawings, the same reference numerals are used to indicate the same or similar components.

Hereinafter, an energy storage system according to an embodiment of the present disclosure will be described with reference to FIG. 2 and FIG. 3.

FIG. 2 is a schematic diagram illustrating an energy storage system according to an embodiment of the present disclosure. FIG. 3 is a schematic diagram illustrating a power flow according to battery charging and discharging in FIG. 2.

First, referring to FIG. 2, an energy storage system 1 according to an embodiment of the present disclosure may manage power of a power system 10, and a DC power distribution network 20 (i.e., DC power system) connected to the power system 10.

For reference, reference numerals shown in FIG. 2 and FIG. 3 are only applied to FIG. 2 and FIG. 3.

Specifically, the energy storage system 1 according to an embodiment of the present disclosure may include a first converter 100, a battery 180, a second converter 200, a load 230, and a third converter 250.

For reference, the energy storage system may further include the power system 10 and the DC power distribution network 20 as well as a distributed power system (not shown) and an emergency generator (not shown). The energy storage system may further include an additional load, for example, a DC load or an AC load other than the load 230.

In this connection, the power system 10 may include, for example, power plants, substations, transmission lines, etc. The load 230 may include, for example, a house, a large building, and a factory. Further, the distributed power system is configured to generate power using an energy source, and may generate power using one or more of fossil fuel, nuclear fuel, renewable energy (solar power, wind power, and tidal power). The emergency generator, for example, may include a diesel generator and may be connected to and disposed between the power system 10 and the first converter 100. When a problem occurs in the power system 10, for example, in an event of power outage of the power system 10, the emergency generator may serve to supply the power to the load 230.

However, for convenience of illustration, an example in which the energy storage system 1 includes the first converter 100, the battery 180, the second converter 200, the load 230, and the third converter 250 will be described herein.

The first converter 100 is connected to and disposed between the power system 10 and the DC power distribution network 20 to control voltage of the DC power distribution network 20.

Specifically, the first converter 100 may convert AC voltage supplied from the power system 10 to DC voltage and may supply the DC voltage to the DC power distribution network 20 or may convert DC voltage supplied from the DC power distribution network 20 to AC voltage and may supply the AC voltage to the power system 10.

Accordingly, the first converter 100 may act as an AC to DC converter.

Further, when the power system 10 is in a normal operation state, the first converter 100 may operate in a DC voltage control mode to control the voltage of the DC power distribution network 20.

For reference, when an accident occurs in the power system 10, that is, when the power system 10 has power outage or is disconnected, the first converter 100 may turn off a gate signal to stop the operation of the system 10.

The second converter 200 may be connected to the DC power distribution network 20 and may control voltage of the load 230.

Specifically, the second converter 200 may convert the DC voltage supplied from the DC power distribution network 20 into an AC voltage and supply the AC voltage to the load 230. Further, the second converter 200 may operate in a CVCF (constant voltage constant frequency) mode to control the voltage of the load 230.

Accordingly, the second converter 200 may act as a DC to AC converter, and the load 230 may act as an AC load.

The third converter 250 may be connected to and disposed between the battery 180 and the load 230 and may control discharge of the battery 180.

Specifically, the third converter 250 may convert a DC voltage supplied from the battery 180 into an AC voltage and supply the AC voltage to the load 230. Further, the third converter 250 may operate in a power control mode to control the power of the battery 180.

Accordingly, the third converter 250 may act as a DC to AC converter.

The battery 180 may be connected to the DC power distribution network 20, and discharge of the battery 180 may be controlled by the third converter 250.

Specifically, the battery 180 may receive and be charged with the power delivered from the power system 10 through the first converter 100 to the DC power distribution network 20. Further, the battery 180 may include at least one battery cell. Each battery cell may include a plurality of bare cells.

Further, the discharge of the battery 180 may be controlled by the third converter 250. The third converter 250 may control the discharge operation of the battery 180 based on a discharge command received from a higher-level controller as described later.

The load 230 may be connected to the second converter 200. The voltage (i.e., power) of the load 230 may be controlled by the second converter 200.

Further, the load 230 may be, for example, an AC load.

In another example, the load 230 may be a DC load. In this case, each of the second converter 200 and the third converter 250 may act as a DC to DC converter. However, for convenience of illustration, an example that the load 230 acts as an AC load will be described herein.

For reference, although not shown in the drawings, the energy storage system 1 according to an embodiment of the present disclosure may further include a communication unit (not shown) and the higher-level controller (not shown).

The communication unit may receive information about the power system 10 (for example, information about whether an accident occurs in the power system 10) from the first converter 100, and may receive power consumption information of the load 230 from the second converter 200.

Further, the communication unit may transmit the information supplied from the first to third converters 100, 200 and 250 to the higher-level controller (not shown) and at least one of the first to third converters 100, 200 and 250, depending on a situation.

The communication unit may be implemented in a high-speed communication manner, for example, using CAN (Controller Area Network). The communication unit may communicate with the first to third converters 100, 200, and 250 and the higher-level controller in a wired or wireless manner.

In another example, the energy storage system 1 according to an embodiment of the present disclosure may not include the communication unit. That is, the first to third converters 100, 200, and 250 and the higher-level controller may directly communicate with each other without a separate communication unit.

Further, the higher-level controller may act as, for example, a PLC (Programmable Logic Controller) or EMS (Energy Management System). The higher-level controller may control all sequence operations of the energy storage system 1, and may transmit a command signal to each component to perform a corresponding operation, depending on a corresponding situation.

Next, referring to FIG. 3, a power flow according to charging and discharging of the battery 180 will be described as follows.

Specifically, in the energy storage system 1 according to an embodiment of the present disclosure, the battery 180 may directly receive and be charged with voltage from the DC power distribution network 20.

More specifically, the AC voltage supplied from the power system 10 to the first converter 100 may be converted to the DC voltage via the first converter 100. The DC voltage may be transferred to the DC power distribution network 20. The voltage delivered to the DC power distribution network 20 may be directly transferred to the battery 180 not via a separate converter.

That is, unlike a conventional energy storage system, the energy storage system 1 according to one embodiment of the present disclosure may not include a converter for a battery, that is, a DC to DC converter (a converter disposed between the DC power distribution network 20 and the battery 180). This may improve a conversion efficiency of the power delivered from the DC power distribution network 20 to the battery 180 and may reduce a cost due to not installing the converter for the battery.

In one example, a power flow path according to the discharge of the battery 180 may include two paths.

First, the voltage discharged from the battery 180 may be transferred to the load 230 via the DC power distribution network 20 and the second converter 200. Second, the voltage discharged from the battery 180 may be transferred directly to the load 230 via the third converter 250. Accordingly, when the load 230 requires a power amount greater than a normally required power amount, that is, is even in the overload state, the overload applied to each converter may be reduced because the discharging path of the battery 180 includes the first and second paths as described above, that is, only one discharging path is not available.

Further, when one of the second converter 200 and the third converter 250 fails, the power of the battery 180 may be transferred to the load 230 via the other thereof. When a problem occurs in the power system 10, the power of the battery 180 may be supplied to the load 230 in an uninterruptible manner via the second and third converters 200 and 250. Thus, reliability of the power supply to the load 230 may be improved.

Hereinafter, an energy storage system 2 according to another embodiment of the present disclosure will be described with reference to FIG. 4 and FIG. 5.

FIG. 4 is a schematic diagram illustrating an energy storage system according to another embodiment of the present disclosure. FIG. 5 is a schematic diagram illustrating a power flow according to battery charging and discharging in FIG. 4.

For reference, an energy storage system 2 according to another embodiment of the present disclosure is the same as the above-described energy storage system 1 except for some components and effects thereof. Thus, following descriptions will focus on the differences therebetween. Further, reference numerals shown in FIG. 4 and FIG. 5 are applied only to FIG. 4 and FIG. 5.

First, referring to FIG. 4, the energy storage system 2 may include the first converter 100, the battery 180, the second converter 200, the load 230, the third converter 250, and a fourth converter 270.

That is, the energy storage system 2 may further include the fourth converter 270 which is not included in the energy storage system 1 as described above.

In this connection, the fourth converter 270 may be connected to and disposed between the battery 180 and the power system 10, and may control charging and discharging of the battery 180.

Specifically, the fourth converter 270 may convert AC voltage supplied from the power system 10 to DC voltage and supply the DC voltage to the battery 180 or may convert DC voltage supplied from the battery 180 to AC voltage and supply the AC voltage to the power system 10.

Accordingly, the fourth converter 270 may act as an AC to DC converter.

Further, the fourth converter 270 may communicate with the aforementioned communication unit or higher-level controller in a wired or wireless manner. In order to control the power of the battery 180, the fourth converter 270 may operate in a power control mode.

Next, referring to FIG. 5, a power flow according to charging and discharging of the battery 180 will be described as follows.

Specifically, in the energy storage system 2 according to another embodiment of the present disclosure, the power flow path according to the charging of the battery 180 may include two paths.

That is, the battery 180 may be charged upon receiving a voltage directly from the DC power distribution network 20 and may be charged upon receiving the voltage via the fourth converter 270.

In this connection, the charging path via the fourth converter 270 may be defined as a primary charging path of the battery 180. The charging path via the DC power distribution network 20 may be defined as an auxiliary charging path of the battery 180. In another example, the charging path via the fourth converter 270 may be defined as an auxiliary charging path of the battery 180. The charging path via the DC power distribution network 20 may be defined as a primary charging path of the battery 180.

Further, when the battery 180 needs to be further charged, the battery 180 may be charged only via the fourth converter 270 so as not to impose burden to the DC power distribution network 20.

Further, in energy storage system 2 according to another embodiment of the present disclosure, a power flow path according to discharge of the battery 180 may include three paths.

Specifically, first, the voltage discharged from the battery 180 may be transferred to the load 230 via the DC power distribution network 20 and the second converter 200. Second, the voltage discharged from the battery 180 may be transferred to the load 230 via the third converter 250. Accordingly, when the load 230 requires a power amount greater than a normally required power amount, that is, is even in the overload state, the overload applied to each converter may be reduced because the discharging path of the battery 180 includes the three paths as described above, that is, only one discharging path is not available.

Further, when one of the second converter 200 and the third converter 250 fails, the power of the battery 180 may be transferred to the load 230 via the other thereof. Further, when necessary, for example, when a problem occurs in the power system 10, the discharged voltage may be supplied to the power system 10 by discharging the battery 180 via the fourth converter 270. In another example, the voltage discharged from the battery 180 under control by the fourth converter 270 may be supplied to the load 230 sequentially via the fourth converter 270, via the first converter 100, and via the second converter 200. In addition, when there is a problem in the power system 10, the power of the battery 180 may be supplied to the load 230 in an uninterruptible manner via the second and third converters 200 and 250. Thus, reliability of the power supply to the load 230 may be improved.

Hereinafter, an energy storage system 3 according to still another embodiment of the present disclosure will be described with reference to FIG. 6 to FIG. 8.

FIG. 6 is a schematic diagram illustrating an energy storage system according to still another embodiment of the present disclosure. FIG. 7 and FIG. 8 are schematic diagrams illustrating a power flow according to battery charging and discharging in FIG. 6.

For reference, the energy storage system 3 according to another embodiment of the present disclosure is the same as the above-described energy storage system 2 except for some components and effects thereof. Following descriptions will focus on the differences. Further, the reference numerals shown in FIG. 6 to FIG. 8 are only applied to FIG. 6 to FIG. 8.

First, referring to FIG. 6, the energy storage system 3 may include the first converter 100, the battery 180, the second converter 200, the load 230, the third converter 250, the fourth converter 270, an auxiliary power system 30, and a switch 290.

That is, the energy storage system 3 may further include the auxiliary power system 30 and the switch 290 which are not include in the energy storage system 2 as described above.

In another example, the energy storage system 3 may not include the auxiliary power system 30. In this embodiment of the present disclosure, an example in which the energy storage system 3 includes the auxiliary power system 30 will be described herein.

The auxiliary power system 30 may be connected to the load 230.

Specifically, the auxiliary power system 30 may include, for example, a power plant, substation, transmission line, etc., and may supply power to the load 230.

Further, the auxiliary power system 30 may operate at all times, like the power system 10 as described above. Alternatively, the auxiliary power system 30 may be configured to operate only in an event of an emergency, for example, when the power system 10 fails. However, in this embodiment of the present disclosure, an example that the auxiliary power system 30 operates only in the emergency event will be described herein.

In one example, the switch 290 may selectively connect the fourth converter 270 to a first node N1 between the power system 10 and the first converter 100 or to a second node N2 between the auxiliary power system 30 and the load 230.

Specifically, one end of the switch 290 may be connected to the fourth converter 270, while the other end of the switch 290 may be selectively connected to one of the first and second nodes N1 and N2. That is, the switch 290 may be connected to the first node N1 when the power system 10 is operating normally. When there is a problem in the power system 10, the switch 290 may be connected to the second node N2.

For reference, the auxiliary power system 30 and the switch 290 may communicate with the above-mentioned communication unit or higher-level controller in a wireless or wired manner.

Next, referring to FIG. 7, a power flow according to charging and discharging of the battery 180 when the power system 10 normally operates will be described as follows.

Specifically, the energy storage system 3 according to still another embodiment of the present disclosure and the energy storage system 2 as described above may have the same power flow according to the charging and discharging of the battery 180 when the power system 10 normally operates.

This is because when the power system 10 normally operates, the power system 10 and the fourth converter 270 are connected to each other via the switch 290.

To the contrary, referring to FIG. 8, the power flow according to charging and discharging of the battery 180 when a problem occurs in the power system 10 will be described as follows.

Specifically, when a problem occurs in the power system 10 while the fourth converter 270 is connected to the first node N1, the fourth converter 270 may be connected to the second node N2 via an switching operation of the switch 290.

Accordingly, even when a problem occurs in the DC power distribution network 20, such that the discharged power of the battery 180 is not transferred to the load 230 via the DC power distribution network 20, the discharged power of the battery 180 may be transferred to the load 230 in an uninterruptible manner via the fourth converter 270 and the third converter 250. Thus, reliability of the power supply to the load 230 may be improved.

Furthermore, when the load 230 requires a power amount greater than a normally required power amount, that is, is even in the overload state, a discharging path of the battery 180 may be divided into a first path via the third converter 250 and a second path via the fourth converter 270, thereby reducing the overload to be applied to each converter.

As described above, in the energy storage systems 1 to 3 according to some embodiments of the present disclosure, the charging and discharging of the battery 180 may be efficiently performed via the various converters, for example, the third converter 250 and the fourth converter 270, thereby to reduce the overload to be applied to each converter during the discharging operation of the battery 180. Further, the non-installation of the battery converter, that is, the DC to DC converter may reduce a cost and improve power conversion efficiency. Furthermore, even when some converters connected to the battery 180 fail, a power supply path for connecting the battery 180 and the load 230 to each other may be secured via the remaining converters. Thus, the reliability of the energy storage system may be secured.

Hereinafter, the energy storage system 4 according to still yet another embodiment of the present disclosure will be described with reference to FIG. 9 and FIG. 10.

FIG. 9 is a schematic diagram illustrating an energy storage system according to still yet another embodiment of the present disclosure. FIG. 10 is a schematic diagram illustrating a power flow according to battery charging and discharging in FIG. 9.

For reference, the energy storage system 4 according to still yet another embodiment of the present disclosure is the same as the above-described energy storage system 1 except for presence or absence of a converter for a battery (that is, a DC to DC converter) as a converter disposed between the DC power distribution network 20 and the battery 180. Following descriptions will focus on the differences. Further, the reference numerals shown in FIG. 9 and FIG. 10 are applied only to FIG. 9 and FIG. 10.

First, referring to FIG. 9, the energy storage system 4 according to still yet another embodiment of the present disclosure may include the first converter 100, a second converter 150, the battery 180, a third converter 200, the load 230, and a fourth converter 250.

For reference, the first converter 100, the battery 180, the third converter 200, the load 230, and the fourth converter 250 included in the energy storage system 4 in FIG. 9 are the same as the first converter, the battery, the second converter, the load, and the third converter in FIG. 1, respectively.

However, a function and a connection relationship of the second converter 150 in FIG. 9 is not shown in FIG. 1. Thus, the energy storage system 4 in FIG. 9 will be described based on this difference.

The first converter 100 may detect occurrence of an accident in the power system 10 and supply the detection result to the second converter 150. The second converter 150 may be connected to the DC power distribution network 20 and may control the charging and discharging of the battery 180.

Specifically, the second converter 150 may convert DC voltage supplied from the DC power distribution network 20 into DC voltage and supply the converted DC voltage to the battery 180 or convert the DC voltage supplied from the battery 180 into DC voltage and supply the converted DC voltage to the DC power distribution network 20.

Accordingly, the second converter 150 may act as a DC to DC converter.

In this connection, converting the DC voltage to the DC voltage may mean increasing or decreasing a level of the DC voltage.

Further, the second converter 150 may operate in a power control mode to control the power of the battery 180 when the power system 10 is in a normal operation state.

Specifically, the second converter 150 may perform charging and discharging of the battery 180 based on a SOC (state of charge) of the battery 180 and a power demand and supply situation of the power system 10 when the power system 10 is operating normally. That is, the second converter 150 may discharge the battery 180 at a maximum load timing when a power consumption of the load is maximum, or may charge the battery 180 at a minimum load timing when the power consumption of the load is minimum, such that a peak reduction function may be performed.

On the other hand, in an event of an accident in the power system 10, the first converter 100 may be stopped and, thus, the second converter 150 may control the voltage of the DC power distribution network 20.

Specifically, when an accident occurs in the power system 10, the second converter 150 may receive the power system accident detection result from the first converter 100 or may detect a voltage change rate (that is, a DC voltage change rate over time) of the DC power distribution network 20 and may determine whether an accident has occurred in the power system 10, based on the detection result.

Further, the second converter 150 may control the voltage of the DC power distribution network 20 based on the detection result of the power system accident.

That is, in the event of the accident in the power system 10, the second converter 150 may control the voltage of the DC power distribution network 20. Thus, the power of the battery 180 may be supplied to the load 230 without delay, that is, in an uninterruptible manner.

The battery 180 may be connected to the second converter 150. Thus, the charging and discharging thereof may be controlled by the second converter 150. The discharge of the battery 180 may be controlled by the fourth converter 250.

Further, the battery 180 may be composed at least one battery cell. Each battery cell may include a plurality of bare cells.

For reference, although not shown in the drawings, the energy storage system 4 according to still yet another embodiment of the present disclosure may further include a communication unit (not shown) and a higher-level controller (not shown).

The communication unit may receive information (for example, whether an accident of the power system 10 occurs) about the power system 10 from the first converter 100, may receive SOC (state of charge) information of the battery 180 or voltage change rate information of the DC power distribution network 20 from the second converter 150, and may receive power consumption information of the load 230 from the third converter 200.

Further, the communication unit may transmit the information supplied from the first to fourth converters 100, 150, 200, and 250 to the higher-level controller (not shown) and at least one of the first to fourth converters 100, 150, 200, and 250 depending on a situation.

The communication unit may be implemented in a high-speed communication manner, for example, using CAN (Controller Area Network) and may communicate with the first to fourth converters 100, 150, 200, and 250 and the higher-level controller in a wired or wireless manner.

In another example, the energy storage system 4 according to still yet another embodiment of the present disclosure may not include the communication unit. That is, the first to fourth converters 100, 150, 200, and 250 and the higher-level controller may directly communicate with each other without a separate communication unit.

Next, referring to FIG. 10, a power flow according to charging and discharging of the battery 180 will be described as follows.

Specifically, in the energy storage system 4 according to still yet another embodiment of the present disclosure, the battery 180 may be charged upon receiving the voltage of the DC power distribution network 20 from the second converter 150. On the contrary, a power flow path according to the discharge of the battery 180 may include two paths.

That is, first, the voltage discharged from the battery 180 under control by the second converter 150 may be transferred to the load 230 via the DC power distribution network 20. Second, the voltage discharged from the battery 180 under control by the fourth converter 250 may be directly transferred to the load 230. Accordingly, when the load 230 requires a power amount greater than a normally required power amount, that is, even in the overload state, the discharging path of the battery 180 may be divided into the first path via the second converter 150 and the second path via the fourth converter 250, thereby reducing the overload to applied to each converter.

Further, when one of the second converter 150 and the fourth converter 250 fails, the power of the battery 180 may be transferred to the load 230 via the other thereof. When a problem occurs in the power system 10, the power of the battery 180 may be supplied to the load 230 in an uninterruptible manner via the second and fourth converters 150 and 250. Thus, reliability of the power supply to the load 230 may be improved.

Hereinafter, an energy storage system 5 according to still yet another embodiment of the present disclosure will be described with reference to FIG. 11 and FIG. 12.

FIG. 11 is a schematic diagram illustrating an energy storage system according to still yet another embodiment of the present disclosure. FIG. 12 is a schematic diagram illustrating a power flow according to battery charging and discharging in FIG. 11.

For reference, the energy storage system 5 according to still yet another embodiment of the present disclosure is the same as the above-described energy storage system 4 except for some components and effects thereof. Following descriptions will focus on the differences. Further, reference numerals shown in FIG. 11 and FIG. 12 are only applied to FIG. 11 and FIG. 12.

First, referring to FIG. 11, the energy storage system 5 may include the first converter 100, the second converter 150, the battery 180, the third converter 200, the load 230, the fourth converter 250, and a fifth converter 270.

That is, the energy storage system 5 may further include the fifth converter 270 which is not included in the energy storage system 4 as described above.

In this connection, the fifth converter 270 may be connected to and disposed between the battery 180 and the power system 10, and may control the charging and discharging of the battery 180.

Specifically, the fifth converter 270 may convert AC voltage supplied from the power system 10 to DC voltage and supply the DC voltage to the battery 180 or may convert DC voltage supplied from the battery 180 to AC voltage and supply the AC voltage to the power system 10.

Accordingly, the fifth converter 270 may act as an AC to DC converter.

Further, the fifth converter 270 may communicate with the aforementioned communication unit or higher-level controller in a wired or wireless manner. In order to control the power of the battery 180, the fifth converter 270 may operate in a power control mode.

Next, referring to FIG. 12, the power flow according to charging and discharging of the battery 180 will be described as follows.

Specifically, in the energy storage system 5 according to still yet another embodiment of the present disclosure, a power flow path according to charging of the battery 180 may include two paths.

That is, the second converter 150 may convert the voltage supplied from the DC power distribution network 20 to charge the battery 180. The fifth converter 270 may convert the voltage supplied from the power system 10 to charge the battery 180.

In this connection, a charging path via the fifth converter 270 may be defined as a primary charging path of the battery 180, while the charging path via the second converter 150 may be defined as an auxiliary charging path of the battery 180. In another example, a charging path via the fifth converter 270 may be defined as an auxiliary charging path of the battery 180, while the charging path via the second converter 150 may be defined as a primary charging path of the battery 180.

Further, in the energy storage system 5 according to still yet another embodiment of the present disclosure, a power flow path according to the discharge of the battery 180 may include three paths.

Specifically, the voltage discharged from the battery 180 under control by the second converter 150 may be transferred to the load 230 via the DC power distribution network 20. The voltage discharged from the battery 180 under control by the fourth converter 250 may be directly transferred to the load 230. Accordingly, when the load 230 requires a power amount greater than a normally required power amount, that is, even in the overload state, the discharging path of the battery 180 may be divided into a path via the second converter 150 and a path via the fourth converter 250, thereby reducing the overload to be applied to each converter.

Further, when one of the second converter 150 and the fourth converter 250 fails, the power of the battery 180 may be transferred to the load 230 via the other thereof. When necessary, for example, when a problem occurs in the power system 10, the discharged voltage may be supplied to the power system 10 by discharging the battery 180 via the fifth converter 270. In another example, the voltage discharged from the battery 180 under control by the fifth converter 270 may be supplied to the load 230 sequentially via the fifth converter 270, via the first converter 100, and via the third converter 200. In addition, when a problem occurs in the power system 10, the power of the battery 180 may be supplied to the load 230 in an uninterruptible manner via the second and fourth converters 150 and 250. Thus, reliability of the power supply to the load 230 may be improved.

Hereinafter, an energy storage system 6 according to still yet another embodiment of the present disclosure will be described with reference to FIG. 13 to FIG. 15.

FIG. 13 is a schematic diagram illustrating an energy storage system according to still yet another embodiment of the present disclosure. FIG. 14 and FIG. 15 are schematic diagrams illustrating a power flow according to battery charging and discharging in FIG. 13.

For reference, the energy storage system 6 according to still yet another embodiment of the present disclosure is the same as the above-described energy storage system 5 except for some components and effects thereof. Following descriptions will focus on the differences. Further, reference numerals shown in FIG. 13 to FIG. 15 are only applied to FIG. 13 to FIG. 15.

First, referring to FIG. 13, the energy storage system 6 includes the first converter 100, the second converter 150, the battery 180, the third converter 200, the load 230, the fourth converter 250, the fifth converter 270, an auxiliary power system 30, and a switch 290.

That is, the energy storage system 6 may further include the auxiliary power system 30 and the switch 290 which are not included in the energy storage system 5 as described above.

In another example, the energy storage system 6 may not include the auxiliary power system 30. However, in this embodiment of the present disclosure, an example that the energy storage system 6 includes the auxiliary power system 30 will be described herein.

The auxiliary power system 30 may be connected to the load 230.

Specifically, the auxiliary power system 30 may include, for example, a power plant, substation, transmission line, etc. and may supply power to the load 230.

Further, the auxiliary power system 30 may operate at all times, like the power system 10 as described above. Alternatively, the auxiliary power system 30 may be configured to operate only in an event of an emergency, for example, when the power system 10 fails. However, in this embodiment of the present disclosure, an example that the auxiliary power system 30 operates only in the emergency event will be described herein.

In one example, the switch 290 may selectively connect the fifth converter 270 to a first node N1 between the power system 10 and the first converter 100 or a second node N2 between the auxiliary power system 30 and the load 230.

Specifically, one end of the switch 290 may be connected to the fifth converter 270, while the other end of the switch 290 may be selectively connected to one of the first and second nodes N1 and N2. That is, the switch 290 may be connected to the first node N1 when the power system 10 is operating normally. When there is a problem in the power system 10, the switch 290 may be connected to the second node N2.

For reference, the auxiliary power system 30 and the switch 290 may communicate with the above-mentioned communication unit or higher-level controller in a wireless or wired manner.

Next, referring to FIG. 14, a power flow according to charging and discharging of the battery 180 when the power system 10 normally operates will be described as follows.

Specifically, the energy storage system 6 according to still yet another embodiment of the present disclosure and the above-described energy storage system 5 may have the same power flow according to the charging and discharging of the battery 180 when the power system 10 normally operates.

This is because when the power system 10 normally operates, the power system 10 and the fifth converter 270 are connected to each other via the switch 290.

On the contrary, referring to FIG. 15, a power flow according to charging and discharging of the battery 180 when a problem occurs in the power system 10 will be described as follows.

Specifically, when a problem occurs in the power system 10 while the fifth converter 270 is connected to the first node N1, the fifth converter 270 may be connected to the second node N2 via a switching operation of the switch 290.

Accordingly, even when a problem occurs in the second converter 150, such that the discharged power of the battery 180 is not transferred to the load 230 via the second converter 150, the discharged power of the battery 180 may be transferred to the load 230 in an uninterruptible manner via the fifth converter 270 and the fourth converter 250. Thus, reliability of the power supply to the load 230 may be improved.

Furthermore, when the load 230 requires a power amount greater than a normally required power amount, that is, even in the overload state, the discharging path of the battery 180 may be divided into a first path via the fourth converter 250 and a second path via the fifth converter 270, thereby reducing the overload to applied to each converter.

As described above, in the energy storage systems 4 to 6 according to some embodiments of the present disclosure, the charging and discharging of the battery 180 may be efficiently performed via the various converters, for example, the second converter 150, the fourth converter 250, and the fifth converter 270. Thus, the overload to be applied to each converter during the discharge operation may be reduced. Furthermore, even when some converters connected to the battery 180 fail, the power supply path for connecting the battery 180 and the load 230 to each other may be secured via the remaining converters. Thus, the reliability of the energy storage system may be secured.

The present disclosure as described above may be subjected to various substitutions, modifications, and changes within the scope of the present disclosure without departing from the technical spirit of the present disclosure by a person having ordinary knowledge in the technical field to which the present disclosure belongs. Thus, the disclosure is not limited to the accompanying drawings.

What is claimed is:

1. An energy storage system for managing power of a power system and power of a direct current (DC) power distribution network connected to the power system, the energy storage system comprising:
   a first converter connected to and disposed between the power system and the DC power distribution network and configured to control voltage of the DC power distribution network;
   a second converter connected to the DC power distribution network;
   a load connected to the second converter, wherein the second converter is configured to control voltage of the load;
   a battery connected to the DC power distribution network; and
   a third converter connected to and disposed between the battery and the load in a path separate from the DC power distribution network, and configured to control discharging of the battery.

2. The energy storage system of claim 1, wherein the battery discharged via the third converter is transferred directly to the load.

3. The energy storage system of claim 1, wherein the energy storage system further comprises a fourth converter connected to and disposed between the battery and the power system, wherein the fourth converter is configured to control charging and discharging of the battery.

4. The energy storage system of claim 3, wherein each of the first and fourth converters is configured to convert voltage supplied from the power system and to charge the battery with the converted voltage.

5. The energy storage system of claim 3, wherein the battery discharged via the third converter is transferred directly to the load,
   wherein the battery discharged under control by the fourth converter is transferred to the power system.

6. The energy storage system of claim 3, wherein the energy storage system further comprises:
   an auxiliary power system connected to the load; and
   a switch configured to selectively connect the fourth converter to a first node between the power system and the first converter or to a second node between the auxiliary power system and the load.

7. The energy storage system of claim 6, wherein one end of the switch is connected to the fourth converter, while the other end of the switch is selectively connected to either the first node or the second node.

8. The energy storage system of claim 6, wherein when the power system fails while the fourth converter is connected to the first node,
   the fourth converter is connected to the second node via an switching operation of the switch,
   the battery is discharged under control by the fourth converter, and
   the battery is discharged to the load via the second node.

9. The energy storage system of claim 3, wherein the first converter operates in a DC voltage control mode to control voltage of the DC power distribution network, wherein the second converter operates in a constant voltage constant frequency (CVCF) mode to control voltage of the load, wherein each of the third and fourth converters operates in a power control mode to control power supplied by the battery.

10. The energy storage system of claim 3, wherein the first converter is configured to convert alternating current (AC) voltage supplied from the power system to DC voltage and supply the converted DC voltage to the DC power distribution network, or to convert DC voltage supplied from the DC power distribution network to AC voltage and supply the converted AC voltage to the power system, wherein the second converter is configured to convert DC voltage supplied from the DC power distribution network into AC voltage and supply the converted AC voltage to the load, wherein the third converter is configured to convert DC voltage supplied from the battery into AC voltage and supply the converted AC voltage to the load, wherein the fourth converter is configured to convert AC voltage supplied from the power system to DC voltage and supply the converted DC voltage to the battery, or to convert DC voltage supplied from the battery to AC voltage and supply the converted AC voltage to the power system.

11. An energy storage system for managing power of a power system and power of a direct current (DC) power distribution network connected to the power system, the energy storage system comprising:

a first converter connected to and disposed between the power system and the DC power distribution network and configured to control voltage of the DC power distribution network;

a second converter connected to the DC power distribution network;

a battery connected to the second converter, wherein the second converter is configured to control charging and discharging of the battery;

a third converter connected to the DC power distribution network;

a load connected to the third converter, wherein the third converter is configured to control voltage of the load; and a fourth converter connected to and disposed between the battery and the load in a path separate from the DC power distribution network, wherein the fourth converter is configured to control discharging of the battery.

12. The energy storage system of claim 11, wherein voltage discharged from the battery under control by the second converter is transferred to the load via the DC power distribution network, wherein the battery discharged via the fourth converter is transferred directly to the load.

13. The energy storage system of claim 11, wherein the energy storage system further comprises a fifth converter connected to and disposed between the battery and the power system, wherein the fifth converter is configured to control charging and discharging of the battery.

14. The energy storage system of claim 13, wherein the second converter is configured to convert voltage supplied from the DC power distribution network and to charge the battery with the converted voltage, wherein the fifth converter is configured to convert voltage supplied from the power system and to charge the battery with the converted voltage.

15. The energy storage system of claim 13, wherein voltage discharged from the battery under control by the second converter is transferred to the load via the DC power distribution network, wherein the battery discharged via the fourth converter is transferred directly to the load, wherein the battery discharged via the fourth converter is transferred directly to the load.

16. The energy storage system of claim 13, wherein the energy storage system further comprises:

an auxiliary power system connected to the load; and a switch configured to selectively connect the fifth converter to a first node between the power system and the first converter or to a second node between the auxiliary power system and the load.

17. The energy storage system of claim 16, wherein one end of the switch is connected to the fifth converter, while the other end of the switch is selectively connected to either the first node or the second node.

18. The energy storage system of claim 16, wherein when the power system fails while the fifth converter is connected to the first node, the fifth converter is connected to the second node via an switching operation of the switch, the battery is discharged under control by the fifth converter, and the battery is discharged to the load via the second node.

19. The energy storage system of claim 13, wherein the first converter operates in a DC voltage control mode to control voltage of the DC power distribution network, wherein each of the second converter and the fourth and fifth converters operates in a power control mode to control power supplied by the battery, wherein the third converter operates in a constant voltage constant frequency (CVCF) mode to control voltage of the load.

20. The energy storage system of claim 13, wherein the first converter is configured to convert alternating current (AC) voltage supplied from the power system to DC voltage and supply the converted DC voltage to the DC power distribution network, or to convert DC voltage supplied from the DC power distribution network to AC voltage and supply the converted AC voltage to the power system, wherein the second converter is configured to convert DC voltage supplied from the DC power distribution network into DC voltage and supply the converted DC voltage to the battery, or to convert DC voltage supplied from the battery into DC voltage and supply the converted DC voltage to the DC power distribution network, wherein the third converter is configured to convert DC voltage supplied from the DC power distribution network into AC voltage and supply the converted AC voltage to the load, wherein the fourth converter is configured to convert DC voltage supplied from the battery into AC voltage and supply the converted AC voltage to the load, wherein the fifth converter is configured to convert AC voltage supplied from the power system to DC voltage and supply the converted DC voltage to the battery, or to convert DC voltage supplied from the battery to AC voltage and supply the converted AC voltage to the power system.

* * * * *